(12) United States Patent
Kuroiwa et al.

(10) Patent No.: US 12,363,415 B2
(45) Date of Patent: Jul. 15, 2025

(54) MOVING OBJECT AND METHOD FOR USING SAME

(71) Applicants: ACSL Ltd., Tokyo (JP); NJS Co., Ltd., Tokyo (JP)

(72) Inventors: Kenji Kuroiwa, Osaka (JP); Shosuke Inoue, Tokyo (JP); Yusuke Inagaki, Suita (JP); Takeshi Aikawa, Ryugasaki (JP)

(73) Assignees: ACSL Ltd., Tokyo (JP); NJS Co., Ltd., Tokyo (JP)

(*) Notice: Subject to any disclaimer, the term of this patent is extended or adjusted under 35 U.S.C. 154(b) by 889 days.

(21) Appl. No.: 17/052,511

(22) PCT Filed: May 9, 2018

(86) PCT No.: PCT/JP2018/017916
§ 371 (c)(1),
(2) Date: Nov. 2, 2020

(87) PCT Pub. No.: WO2019/215839
PCT Pub. Date: Nov. 14, 2019

(65) Prior Publication Data
US 2021/0237709 A1   Aug. 5, 2021

(51) Int. Cl.
*H04N 23/57* (2023.01)
*F16L 55/18* (2006.01)
(Continued)

(52) U.S. Cl.
CPC .............. *H04N 23/57* (2023.01); *F16L 55/18* (2013.01); *F17D 5/00* (2013.01); *H04N 23/45* (2023.01); *H04N 23/555* (2023.01)

(58) Field of Classification Search
CPC ...... H04N 23/57; H04N 23/45; H04N 23/555; F16L 55/18; F17D 5/00; B60V 1/11; B60V 1/14
See application file for complete search history.

(56) References Cited

U.S. PATENT DOCUMENTS 480,533 A * 8/1892 Walker ................... B63H 11/08
60/222
6,880,195 B1   4/2005 Bahari
(Continued)

FOREIGN PATENT DOCUMENTS

CN   101234665 A  *  8/2008
CN   101693469 A     4/2010
(Continued)

OTHER PUBLICATIONS

International Search Report mailed on Jun. 5, 2018, issued in connection with International Application No. PCT/JP2018/017916, filed on May 9, 2018, 2 pages.
(Continued)

*Primary Examiner* — Michael Lee
(74) *Attorney, Agent, or Firm* — McDonnell Boehnen Hulbert & Berghoff LLP

(57) ABSTRACT

The purpose of the present invention is to provide a moving object comprising a configuration suitable for miniaturization in a view from at least one direction, and to provide a method for using the same. Provided is a moving object comprising: two or more rotors positioned at the front side and at the rear side in the traveling direction; and a driving device that drives the two or more rotors and rotates at least two of the two or more rotors in mutually different directions.

9 Claims, 19 Drawing Sheets

(51) Int. Cl.
  *F17D 5/00* (2006.01)
  *H04N 23/45* (2023.01)
  *H04N 23/50* (2023.01)

(56) References Cited

U.S. PATENT DOCUMENTS

| | | | |
|---|---|---|---|
| 7,510,142 B2 * | 3/2009 | Johnson | B64C 39/022 |
| | | | 244/175 |
| 9,328,577 B2 * | 5/2016 | Hallundbæk | E21B 23/00 |
| 9,714,020 B1 | 7/2017 | Bennett | |
| 2004/0129833 A1 | 7/2004 | Perlo et al. | |
| 2007/0034738 A1 | 2/2007 | Sanders | |
| 2007/0200027 A1 | 8/2007 | Johnson | |
| 2010/0044496 A1 | 2/2010 | Gosling | |
| 2012/0256043 A1 | 10/2012 | Gosling | |
| 2012/0305714 A1 | 12/2012 | Gosling | |
| 2017/0307126 A1 | 10/2017 | Cheatham, III | |
| 2018/0022454 A1 | 1/2018 | Zhang | |
| 2018/0059665 A1 | 3/2018 | Shin | |
| 2020/0277050 A1 | 9/2020 | Bryzik | |

FOREIGN PATENT DOCUMENTS

| | | | | |
|---|---|---|---|---|
| CN | 101888948 A | * | 11/2010 | ............ B63H 11/08 |
| CN | 104843176 A | | 8/2015 | |
| CN | 106442570 A | | 2/2017 | |
| CN | 106864739 A | | 6/2017 | |
| JP | H08-080842 A | | 3/1996 | |
| JP | 8-258703 A | | 10/1996 | |
| JP | 2010524765 A | | 7/2010 | |
| JP | 2016-199144 A | | 12/2016 | |
| JP | 2017-087917 A | | 5/2017 | |
| JP | 6186666 B1 | | 8/2017 | |
| JP | 2017-226259 A | | 12/2017 | |
| JP | 2018-001967 A | | 1/2018 | |
| KR | 100927699 B1 | | 11/2009 | |
| KR | 201836512 A | * | 4/2018 | |
| WO | 2011132817 A1 | | 10/2011 | |
| WO | 2016/121008 A1 | | 8/2016 | |
| WO | 2019093913 A1 | | 5/2019 | |

OTHER PUBLICATIONS

Written Opinion mailed on Jun. 5, 2018, issued in connection with International Application No. PCT/JP2018/017916, filed on May 9, 2018, 3 pages.

* cited by examiner

FIG.8
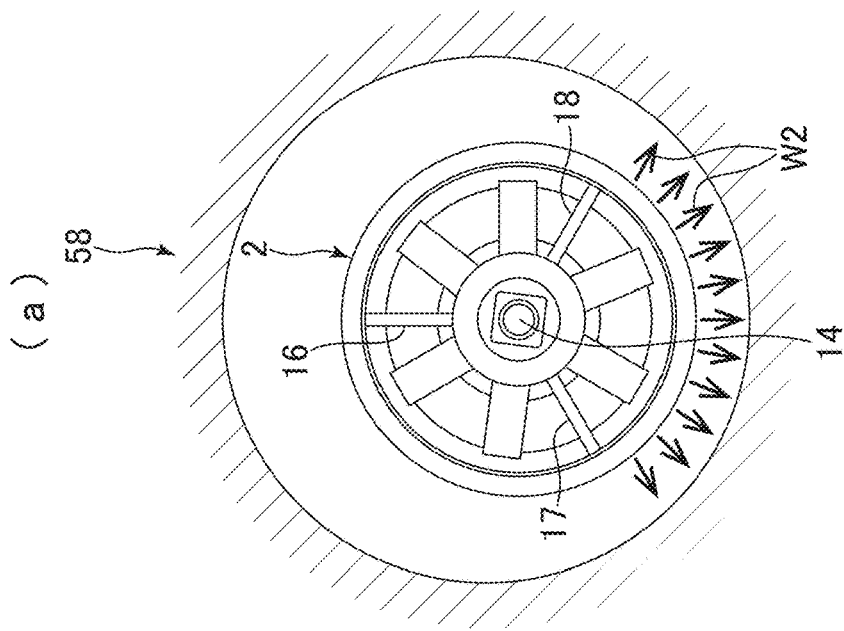
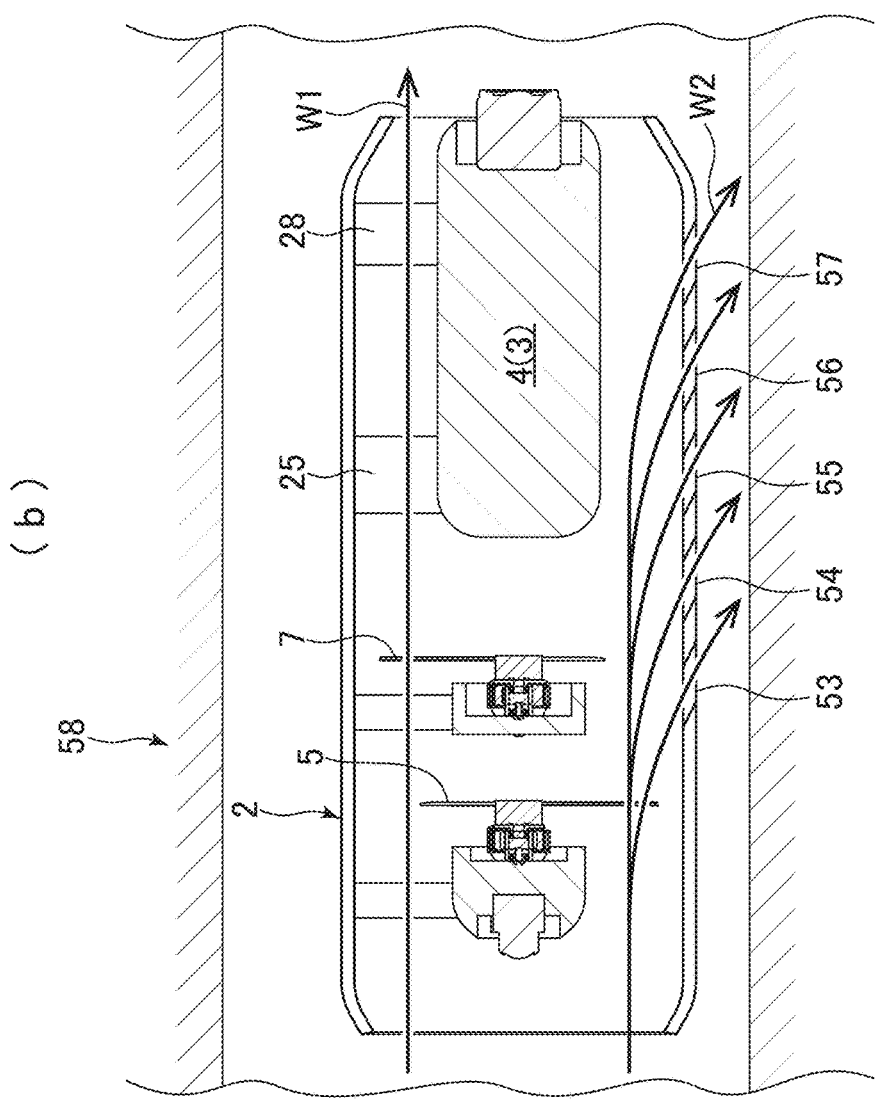

MOVING OBJECT AND METHOD FOR USING SAME

CROSS-REFERENCE TO RELATED APPLICATIONS

This application is a U.S. National Phase Application under 35 U.S.C. § 371 of International Application No. PCT/JP2018/017916, filed May 9, 2018, the disclosure of which is incorporated herein by reference in its entirety.

TECHNICAL FIELD

The present invention relates to a moving object and a method for using the same. More specifically, the present invention relates to a moving object configured to move in any environment, for example, in closed-type spaces including a cylindrical space and a rectangular space, and a method for using the same.

BACKGROUND ART

Sewer pipes are expected to last about 50 years and thus the number of facilities with sewer pipes reaching the end of the life expectancies is expected to considerably increase in the future. For efficient maintenance, it is essential to check the conditions of sewer pipelines.

Conventionally, methods for checking the conditions of sewer pipelines include a direct visual check by an inspector in a pipe, image-capturing by a television camera placed in a pipe and connected to the ground via a cable, and image-capturing by a moving television camera mounted on a mobile vehicle in a pipe and connected to the ground via a cable. However, a direct visual check by an inspector may suffer various problems, for example, poisonous gas may be generated in a sewer pipeline and affect a human body or sudden rain may cause a flood. Moreover, in the method using a television camera placed in a pipe, a sufficient inspection speed may not be obtained or a vehicle may be difficult to control when a water level rises in a sewer pipeline.

Furthermore, in some thin sewer pipelines, a direct visual check by an inspector and traveling of a mobile vehicle are difficult. Thus, in order to inspect such pipelines, unmanned machines suitably designed for miniaturization are needed.

CITATION LIST

Patent Literature

Patent Literature 1: Japanese Patent Laid-Open No. 2017-087917 (Japan)
Patent Literature 2: Japanese Patent Laid-Open No. 2017-226259 (Japan)
Patent Literature 3: Japanese Patent Laid-Open No. 2018-001967 (Japan)

SUMMARY OF INVENTION

Technical Problem

An object of the present invention is to provide a moving object suitably configured for miniaturization when viewed in at least one direction, and a method for using the same.

Solution to Problem

In order to solve the problem, the present invention provides a moving object including at least two rotors arranged back and forth in a traveling direction, and a drive device for driving the at least two rotors and rotating at least two of the at least two rotors in different directions.

The drive device may include at least two motors for providing the respective rotors with powers, and at least two of the at least two motors may be configured to rotate the rotors powered by them in different directions.

The moving object may include an attitude information sensor for measuring attitude information on the attitude of the moving object; and an attitude control unit for controlling the drive device such that the attitude of the moving object is controlled by controlling the rotation speed of at least one of the at least two rotors according to the attitude information measured by the attitude information sensor.

The moving object may further include a traveling direction shooting camera and a traveling-direction captured image data transmitter. The moving object may be configured to capture an image in the traveling direction by means of the traveling direction shooting camera and move while transmitting obtained traveling direction captured image data from the traveling direction captured image data transmitter to the outside.

The moving object may further include a rear direction shooting camera.

The moving object may be configured such that the rear-direction shooting camera is positioned on the rear side of the at least two rotors in the traveling direction and at least a part of the rotors is not interrupted by the rear direction shooting camera when viewed from the rear side.

The moving object may be connected to a linear member.

The linear member may include a power supply line, and the moving object may be configured to move while receiving power supply from an external power supply through the power supply line.

The moving object may further include a cover member at least partially covering the at least two rotors with a side surface, with respect to the traveling direction, of the cover member. The cover member may be provided with exhaust holes in the side surface at a lower side of the cover member.

The present invention provides a method for using a moving object, the moving object including: at least two rotors arranged back and forth in the traveling direction; a drive device for driving the at least two rotors and rotating at least two of the at least two rotors in different directions; and a rear-direction shooting camera, the method including the steps of moving the moving object in the traveling direction in a closed-type space, the moving object being connected to linear members; and capturing the interior of the closed type space by means of the rear direction shooting camera while moving the moving object in a direction opposite to the traveling direction by using the linear member.

Advantageous Effect of Invention

The moving object according to the present invention includes the at least two rotors arranged back and forth in the traveling direction. This configuration is suitable for miniaturization when viewed in the traveling direction. Using the configuration enables operations in various environments.

BRIEF DESCRIPTION OF DRAWINGS

FIG. 8 illustrates gas flows when the rotors rotate in the configuration where the exhaust holes are formed as in FIG. 7.

DESCRIPTION OF EMBODIMENT

Figure 1A:
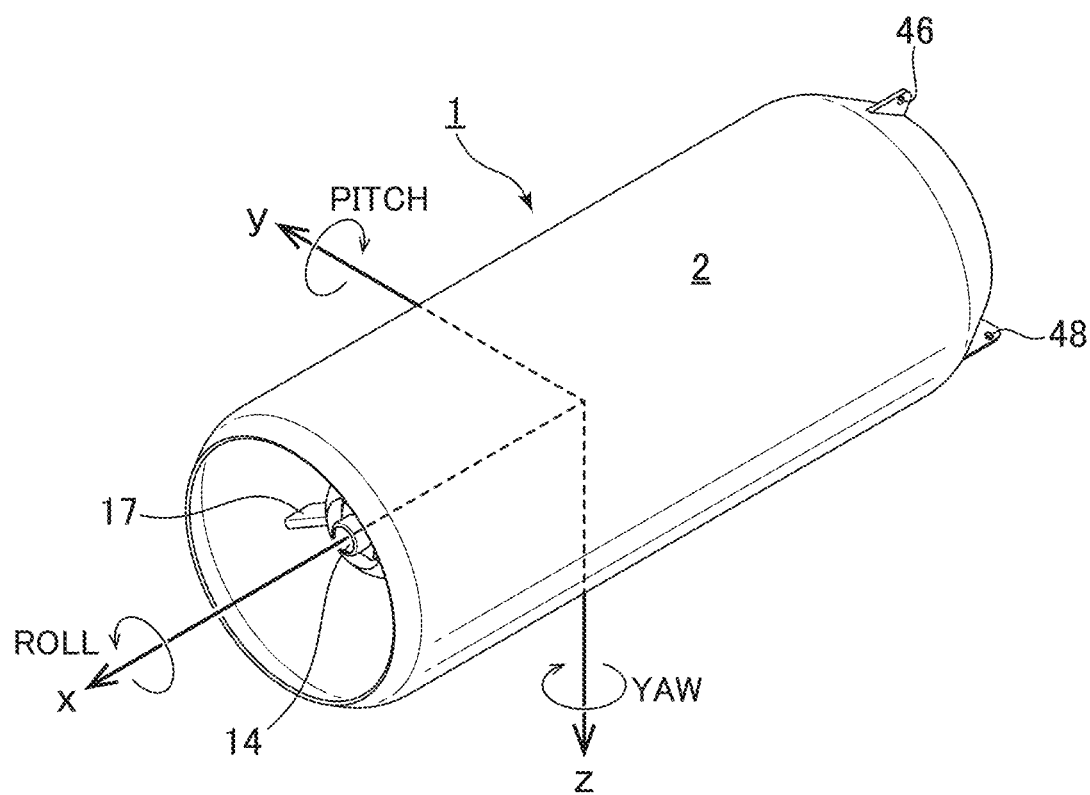
FIG. 1A is a perspective view of a moving object according to an embodiment of the present invention.

A moving object and a method for using the same according to an embodiment of the present invention will be described below with reference to the accompanying drawings. It should be noted that the moving object and the method for using the same according to the present invention are not limited to the following specific embodiment and can be optionally changed within the scope of the present invention. For example, the moving object of the present invention is not necessarily configured as an autonomously controlled moving object. The functional configuration of the moving object is not limited to that of FIG. 3 and any configuration may be used as long as similar operations can be performed. For example, operations to be performed by a plurality of components may be performed by a single component by integrating the function of a communication unit with a main arithmetic unit or operations to be performed by an illustrated single component may be performed by a plurality of components by distributing the function of the main arithmetic unit to a plurality of arithmetic units. The autonomous control program of the moving object may be recorded in recording devices such as a hard disk drive and read and executed by the main arithmetic unit (an illustrated autonomous control program may be divided into a plurality of program modules or any other programs may be executed by, for example, the main arithmetic unit) or similar operations may be performed by a built-in system using a microcomputer or the like. The moving object of the present invention may not be provided with all the components of the following embodiment (for example, if the moving object is completely moved by external control without autonomous control, an autonomous control program and databases are not necessary). The method of the present invention may not be provided with all the steps of the embodiment. Rotors provided for the moving object (any rotors including a propeller for generating thrust and a rotary wing for floating the moving object may be used. In the following example, a rotor including three rotor blades is used and the rotor may have any specific structure) are not limited to three rotors 5 to 7 that are illustrated in, for example, FIG. 1J. Any two or more rotors may be used instead. The rotor may have any shapes such as a twisted shape. The moving object may have any size. In the following example, the moving object moves while taking photographs in a closed type space. The moving object of the present invention can be moved for any purpose in any environment instead of the closed-type space ("moving" of the moving object may be moving in any form, for example, moving in sliding contact with the ground or a water surface, moving in a noncontact manner in the configuration of FIG. 8, or floated and flown by the rotations of the rotors). The closed-type space is not limited to a completely closed-type space. At least a part of the space may be closed so as to restrict at least part of the moving of the moving object. For example, as will be described in the following embodiment, a cylindrical space in a sewer pipeline connected to the outside via a manhole is also a closed-type space and a highway tunnel is also a closed-type space. Members constituting the moving object may be made of, for example, metals or plastics. The members may be made of any materials such as an elastic body if the functions of the moving object are obtained.

The Configuration of the Moving Object

Figure 1B:
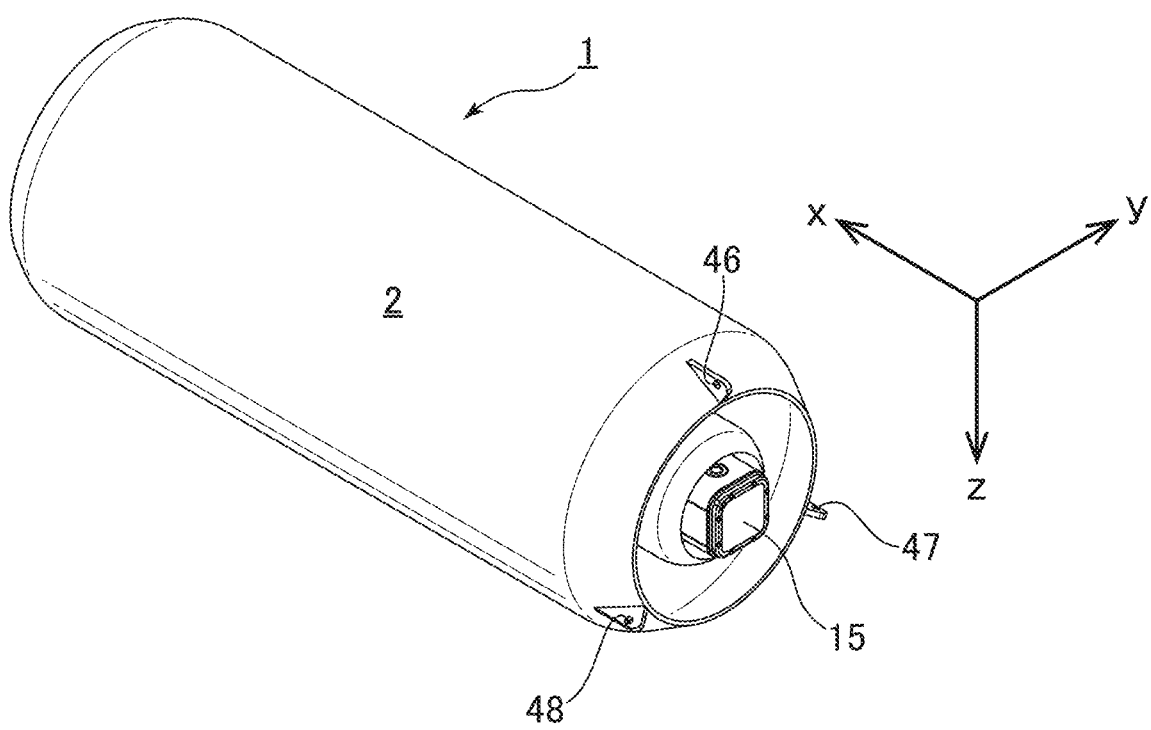
FIG. 1B is a perspective rear view illustrating the moving object of FIG. 1A in the traveling direction.
Figure 1C:
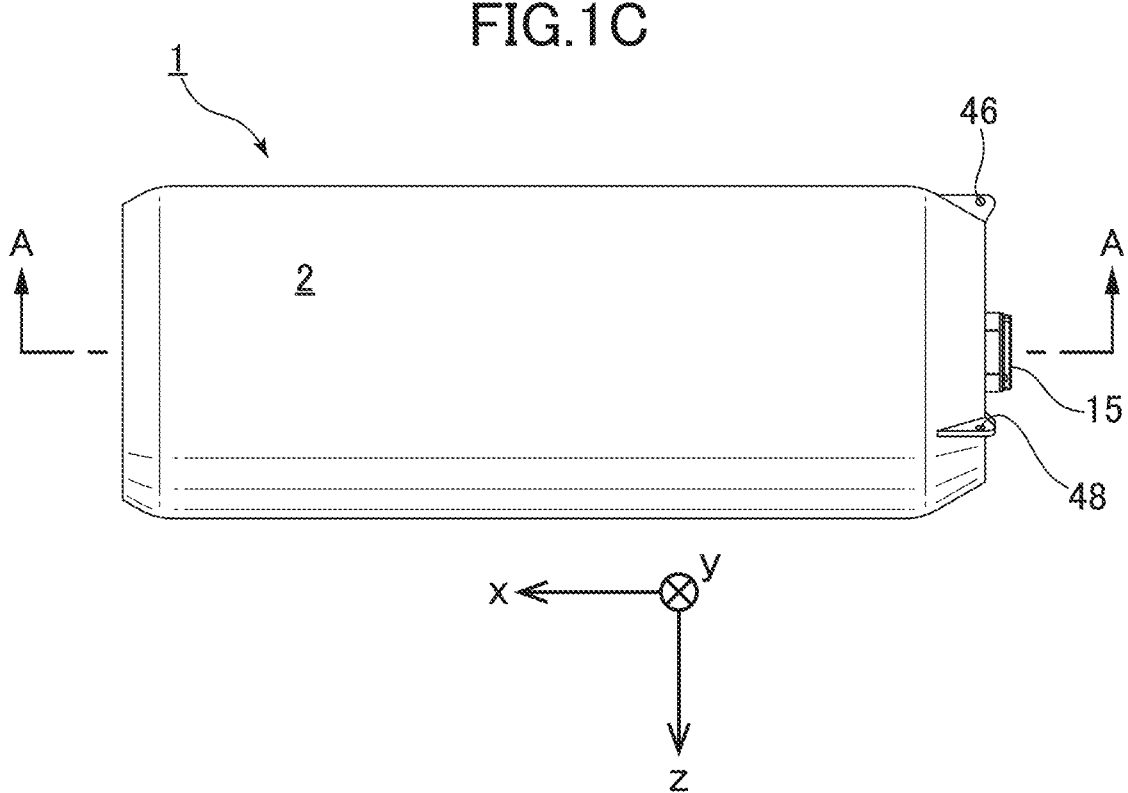
FIG. 1C illustrates the moving object of FIG. 1A in the negative direction of y.
Figure 1D:
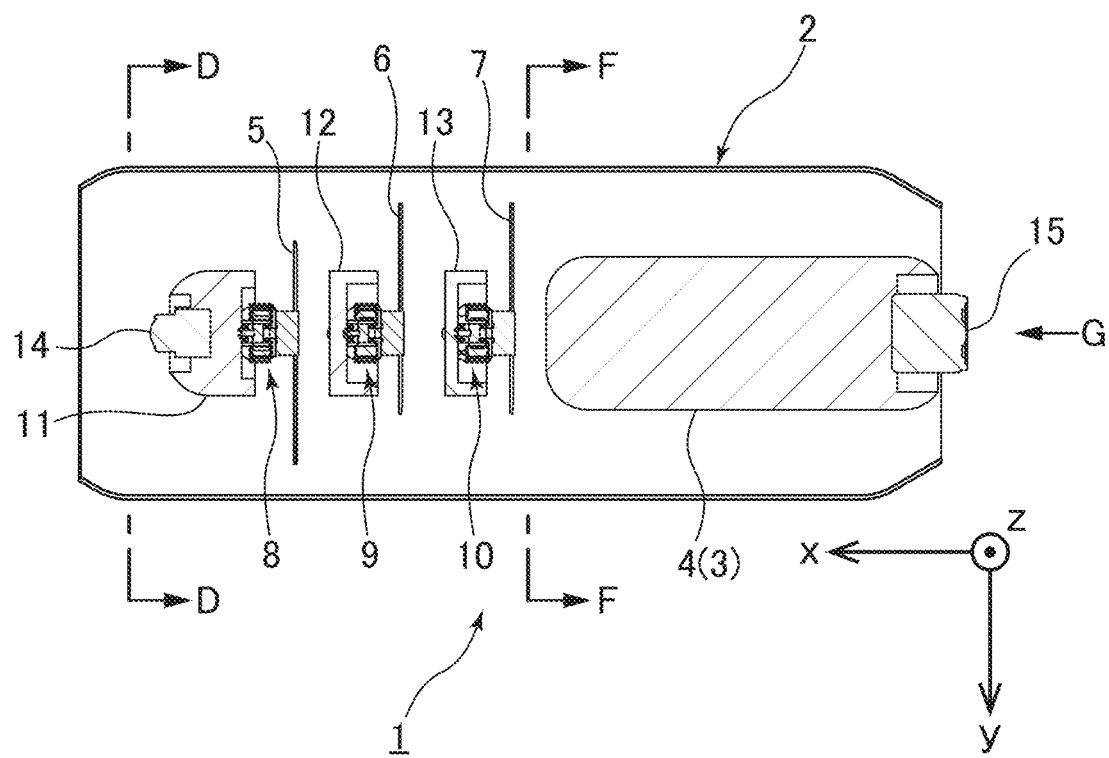
FIG. 1D illustrates a cross section of the moving object of FIG. 1A, the cross section being taken along A-A plane of FIG. 1C.
Figure 1E:
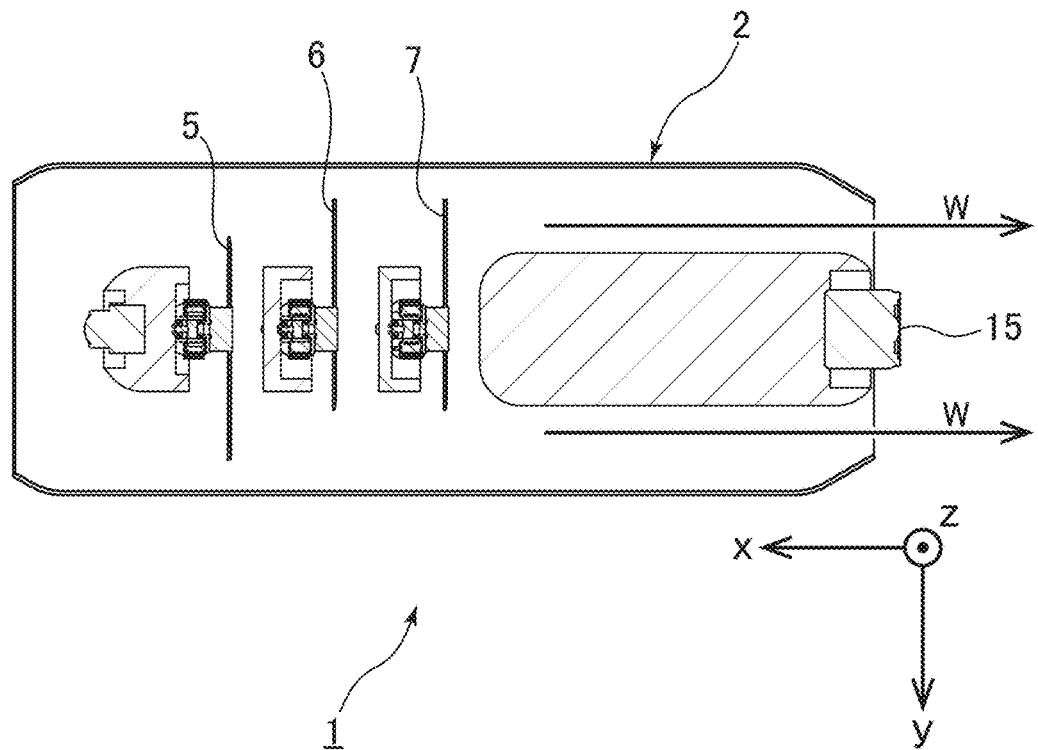
FIG. 1E illustrates an example of a gas flow when rotors are rotated in the cross-sectional view of FIG. 1D.
Figure 1F:
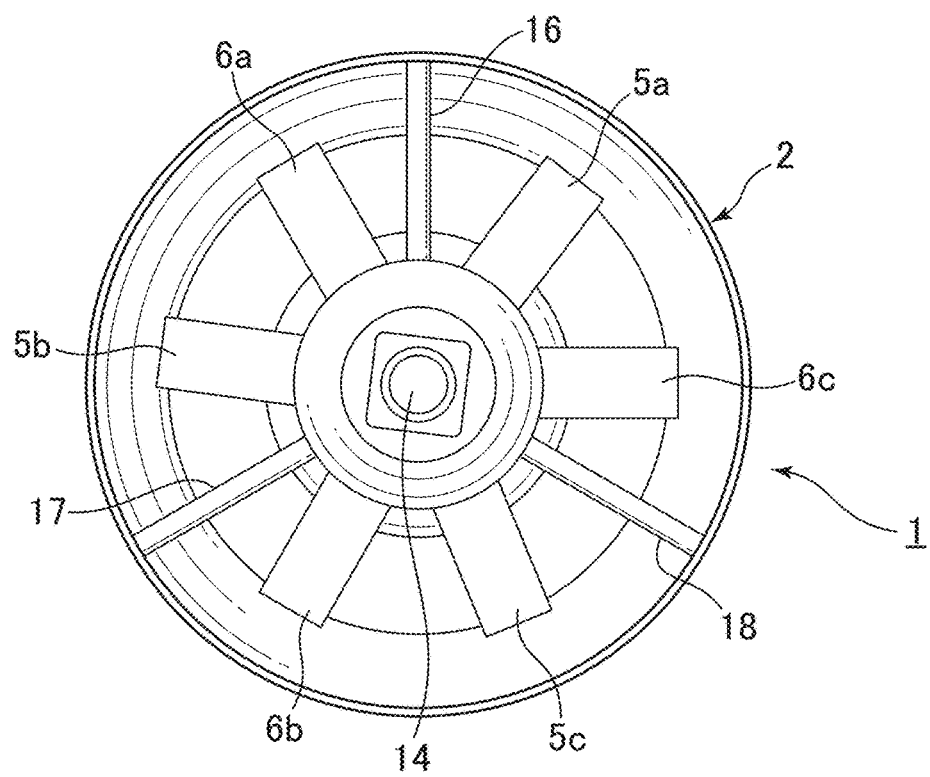
FIG. 1F illustrates a cross section of the moving object of FIG. 1A, the cross section being taken along D-D plane of FIG. 1D.
Figure 1G:
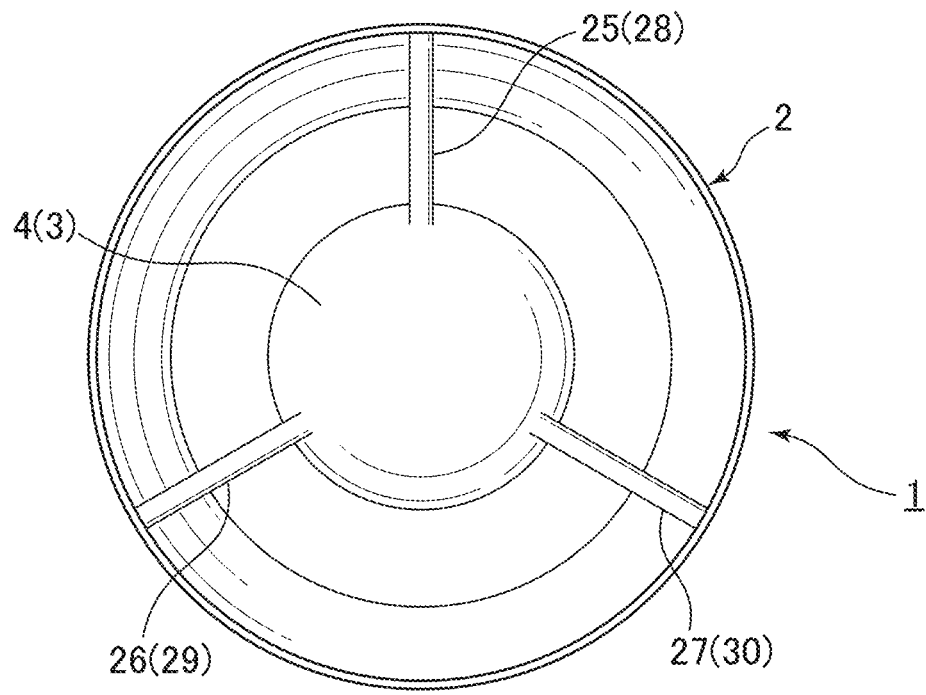
FIG. 1G illustrates a cross section of the moving object of FIG. 1A, the cross section being taken along F-F plane of FIG. 1D.
Figure 1H:
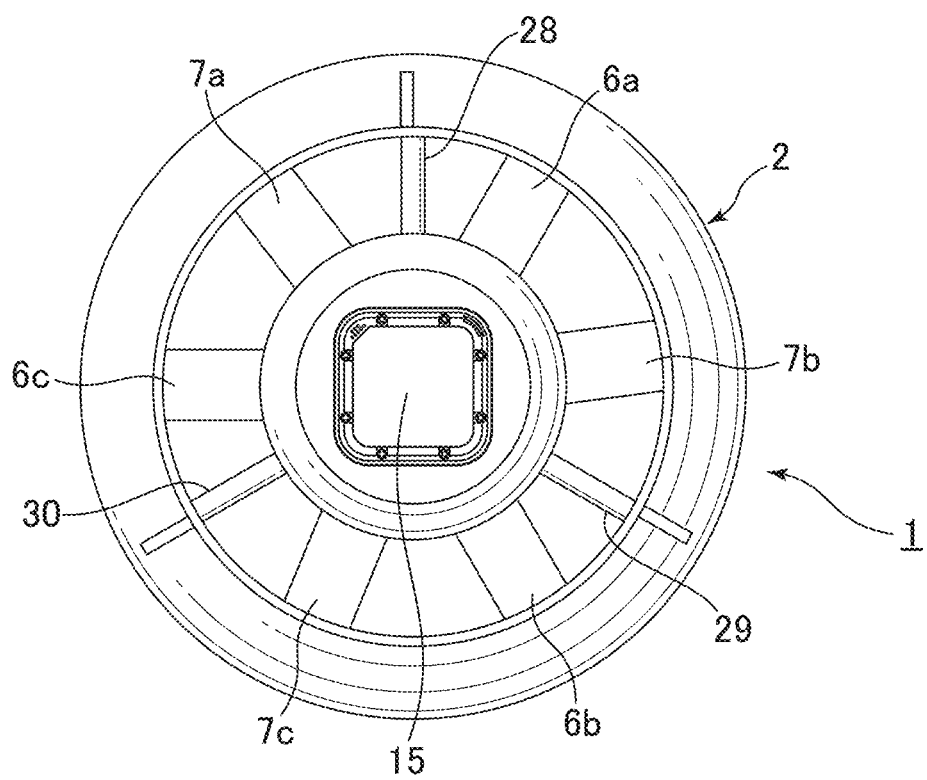
FIG. 1H illustrates the moving object of FIG. 1A in the direction of an arrow G of FIG. 1D.
Figure 1I:
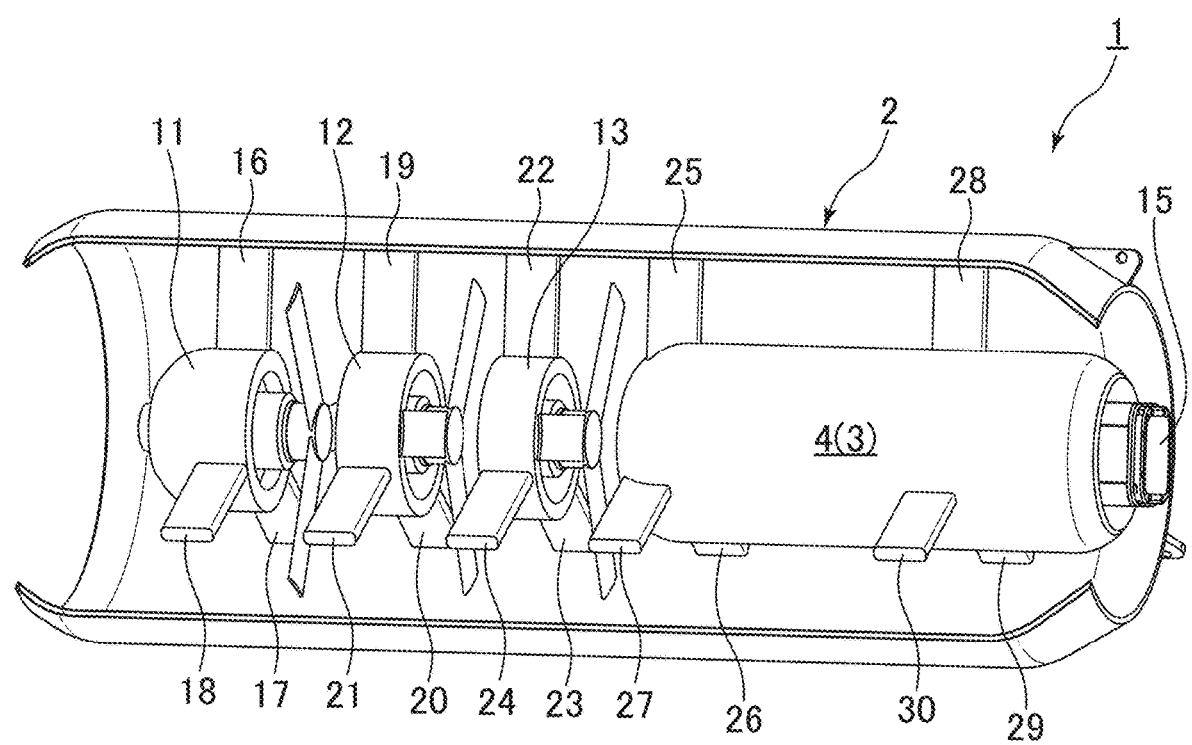
FIG. 1I illustrates the internal structure of the moving object of FIG. 1A.
Figure 1J:
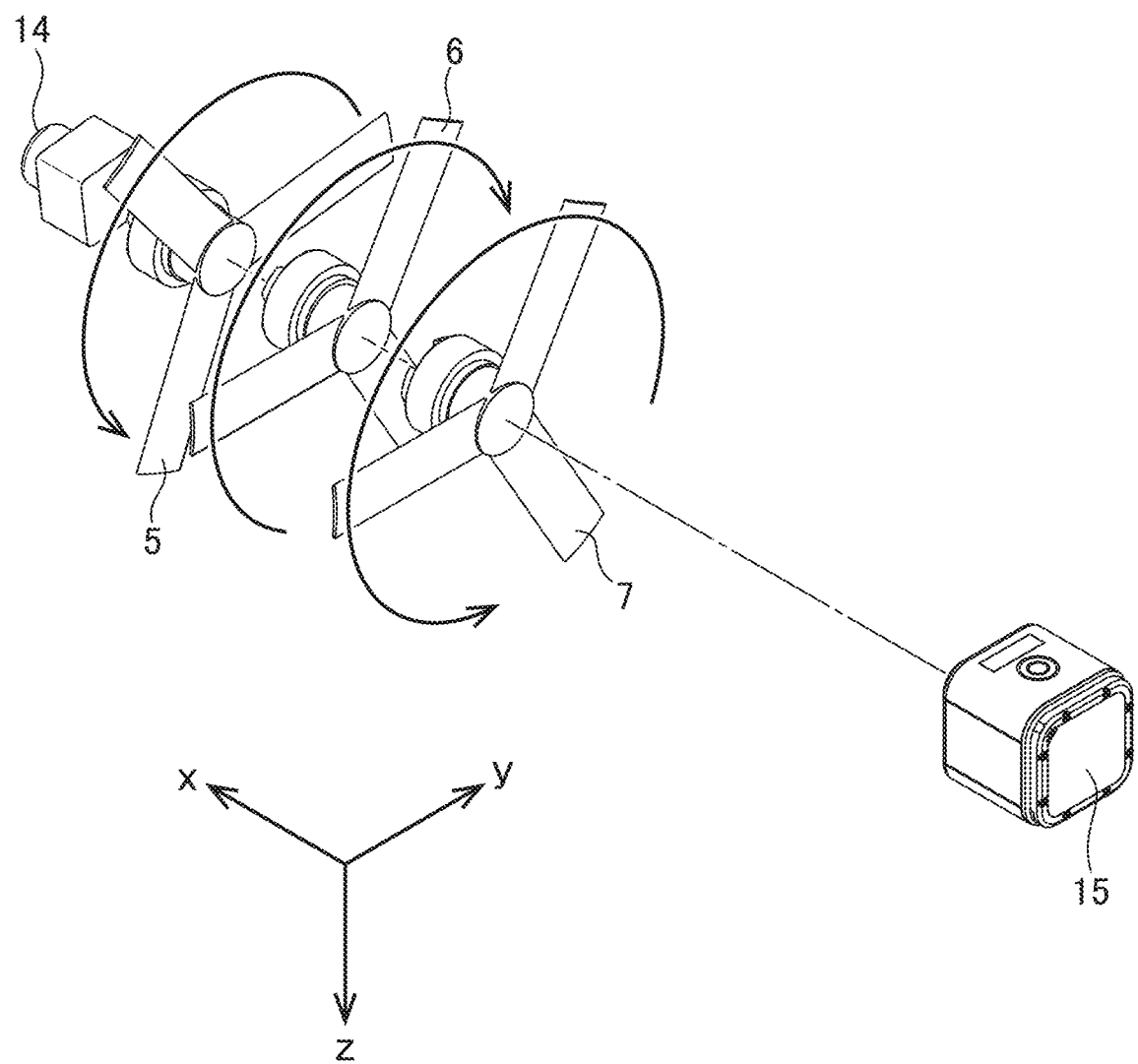
FIG. 1J illustrates the rotation directions of the rotors without illustrating the body part and the connecting arms of the internal structure of FIG. 1I.

FIGS. 1A to 1J illustrate the appearance, internal configuration, and cross-sectional views of the three-rotor moving object according to the embodiment of the present invention. FIG. 1A is a perspective view, FIG. 1B is a perspective rear view illustrating the moving object of FIG. 1A in a traveling direction, FIG. 1C is a view in the negative direction of y, and FIG. 1D illustrates a cross section taken along A-A plane of FIG. 1C (The interior of a body part 3 is omitted. Also in other drawings, some components are omitted to simplify the explanation). FIG. 1E illustrates an example of a gas flow when the rotors are rotated, FIG. 1F illustrates a cross section of the moving object of FIG. 1A, the cross section being taken along D-D plane of FIG. 1D, FIG. 1G illustrates a cross section of the moving object of FIG. 1A, the cross section being taken along F-F plane of FIG. 1D, FIG. 1H illustrates the moving object of FIG. 1A in the direction of an arrow G of FIG. 1D, FIG. 1I illustrates the internal structure of the moving object of FIG. 1A, and FIG. 1J illustrates the rotation directions of the rotors without illustrating the body part and the connecting arms of the internal structure of FIG. 1I. As illustrated in FIG. 1A, a rotation in the direction of an arrow about the x-axis direction of FIG. 1A is (positive) rolling, a rotation in the direction of an arrow about y axis is (positive) pitching, and a rotation in the direction of an arrow about z axis is (positive) yawing (in FIG. 1B and subsequent drawings, the coordinate axes are shifted from a moving object 1 for ease of viewing).

For example, the moving object. 1 is designed with a total width of about 160 mm (in y direction in FIG. 1A) and an overall length of about 500 mm (in x direction in FIG. 1A) so as to move in a closed-type space having a diameter of about 400 mm. The moving object 1 includes the body part 3 (stored in a waterproof case 4), three motors 8 to 10 (see FIG. 3) for driving under the control of the body part 3, the three rotors 5 to 7 that are rotated by the driving of the motors 8 to 10 and move the moving object 1 (at least two of the rotors 5 to 7 rotate in different directions such that, for example, the rotors 5 and 7 rotate counterclockwise when viewed from the negative-direction side of x while the rotor 6 rotates clockwise when viewed from the negative-direction side of x. The rotation axes of the rotors 5 to 7 extend along x axis of FIG. 1A (also along the traveling direction) and the rotors 5 to 7 rotate along planes orthogonal to x axis of FIG. 1A (as has been discussed, this configuration is not always necessary and thus the rotation axes of the rotors 5 to 7 and planes and spaces where the rotors 5 to 7 rotate are basically optional). See FIG. 1J. The rotor 5 includes rotor blades 5a, 5b, and 5c, the rotor 6 includes rotor blades 6a, 6b, and 6c, and the rotor 7 includes rotor blades 7a, 7b, and 7c. See FIGS. 1F and 1H), a front camera 14, and a rear direction shooting camera 15. The components including the rotors and the body part are at least partially covered with a cover member 2 on the side of the moving object. 1 in the traveling direction (the positive direction of x in FIG. 1A). The cover member 2 is similar in shape to the side of a cylinder (a hollow shape as will be described later). The cover member 2 has holes 46 to 48 for connection to the moving object 1 via linear members 49 to 51 as will be describe later (see FIG. 5). The rotors 5 to 7 are arranged back and forth in the traveling direction, allowing size reduction when viewed in the traveling direction (in FIG. 1A, the size of the area of the moving object 1 on yz plane). Regarding this point, the configuration of the moving object 1 is advantageous for moving through thin pipes or the like.

The front camera 14 is a camera for capturing still images or moving images in the traveling direction when being moved in a closed-type space by the moving object 1. Data on the captured still images or moving images is transmitted to an external apparatus (e.g., a computer provided with a display) at any time. An operator can operate the moving object 1 while checking the data. The rear direction shooting camera 15 is a camera for capturing still images or moving images rearward (in FIG. 1A, the negative direction of x) when being moved in a closed type space by the moving object 1. A commercial camera of, for example, GoPro session (TAJIMA MOTOR CORPORATION Co., Ltd.) may be used. The front camera 14 and the rear direction shooting camera 15 may be cameras such as an infrared camera and an ultraviolet camera.

As illustrated in FIG. 1D, the motors 8 to 10 are held by motor holding parts 11 to 13, respectively (the motor holding part 11 also holds the front camera 14 and the rear direction shooting camera 15 is connected to the body part 3 and is held by the waterproof case 4). The motor holding part 11 is connected to the cover member 2 via connecting arms 16 to 18, the motor holding part 12 is connected to the cover member 2 via connecting arms 19 to 21, and the motor holding part 13 is connected to the cover member 2 via connecting arms 22 to 24 (FIG. 1I). The waterproof case 4 accommodating the body part 3 is connected to the cover member 2 via connecting arms 25 to 30 (FIG. 1I). As will be described later with reference to FIG. 4, the connecting arms 16 to 30, the cover member 2, and the waterproof case 4 are formed as hollow members. Wires or the like are passed through the hollow parts so as connect the components included in the body part 3 to components such as the front camera 14 and the motors 8 to 10 outside the body part 3.

When the rotors 5 to 7 rotate, for example, gas flows in directions indicated by arrows W in FIG. 1E (when the traveling direction is a horizontal direction, that is, a direction orthogonal to gravity), allowing the moving object 1 to move in the traveling direction (x direction in FIG. 1A). In the moving object 1 of the present example, the rear direction shooting camera 15 is positioned on the rear side of the rotors 5 to 7 in the traveling direction (in FIG. 1A, on the negative direction side of x). As illustrated in FIG. 1H, the rotors 5 to 7 are disposed such that at least a part of the rotors 5 to 7 is not interrupted by the rear direction shooting camera 15 when viewed from the rear side (the rotor blades 5a, 5b, and 5c of the rotor 5 are omitted in FIG. 1H but are disposed such that at least a part of the rotor blades is not interrupted by the rear-direction shooting camera 15 like the rotors 6 and 7). This generates gas flows as illustrated in FIG. 1E. However, the layout of the rotors 5 to 7 is not always necessary. Even if the rotors 5 to 7 are completely interrupted by the rear direction shooting camera 15 when viewed from the rear side, openings (clearances) may be obtained so as to deliver gas from the positions of the rotors 5 to 7 to the rear side as indicated by the arrows W in FIG. 1E. In an example, thrust is generated by a reaction of gas and moves the moving object 1. In another example, lift is generated by the rotations of the rotors 5 to 7 and floats the moving object 1 (when the traveling direction is a vertically upward direction, that is, a direction opposite to the direction of gravitational force). In the following explanation, the traveling direction of the moving object 1 is basically a horizontal direction. It is to be noted that the traveling direction may be defined as any direction.

Figure 1K:
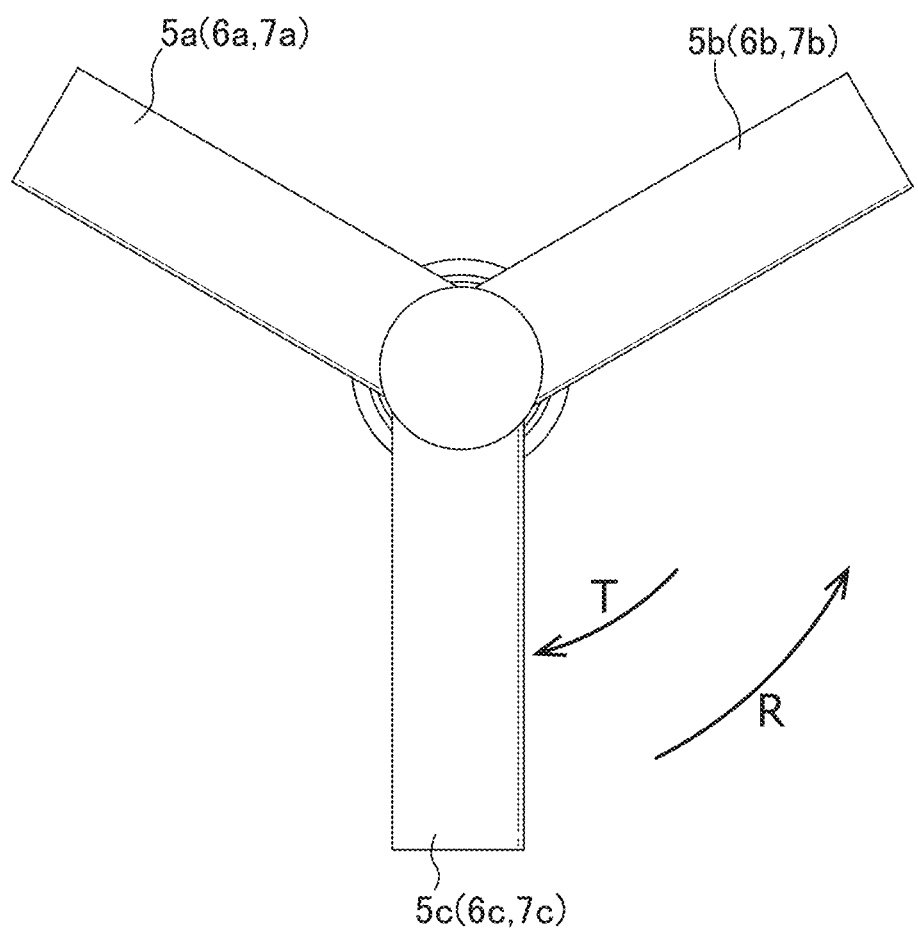
FIG. 1K indicates the rotation direction of the rotor and the rotation direction of torque generated by the rotation of the rotor.

FIG. 1K indicates the rotation direction of the rotor and the rotation direction of torque generated by the rotation of the rotor. In FIG. 1K, the rotation of the rotor 5 (6, 7) in the direction of an arrow R generates, as a reaction of the rotation, torque for rotating the moving object 1 in the direction of an arrow T in FIG. 1K. In the present example, at least two of the rotors 5 to 7 rotate in different directions. If the rotors 5 to 7 are rotated in directions indicated in FIG. 1J, torque generated by the rotations of the rotors 5 and 7 and torque generated by the rotation of the rotor 6 rotate the moving object 1 in opposite directions. Thus, the rotations (rolling) of the moving object 1 by the actions of the torque generated by the rotations of the rotors can be cause to at least partially cancel each other out and produce a lower torque.

Figure 2:
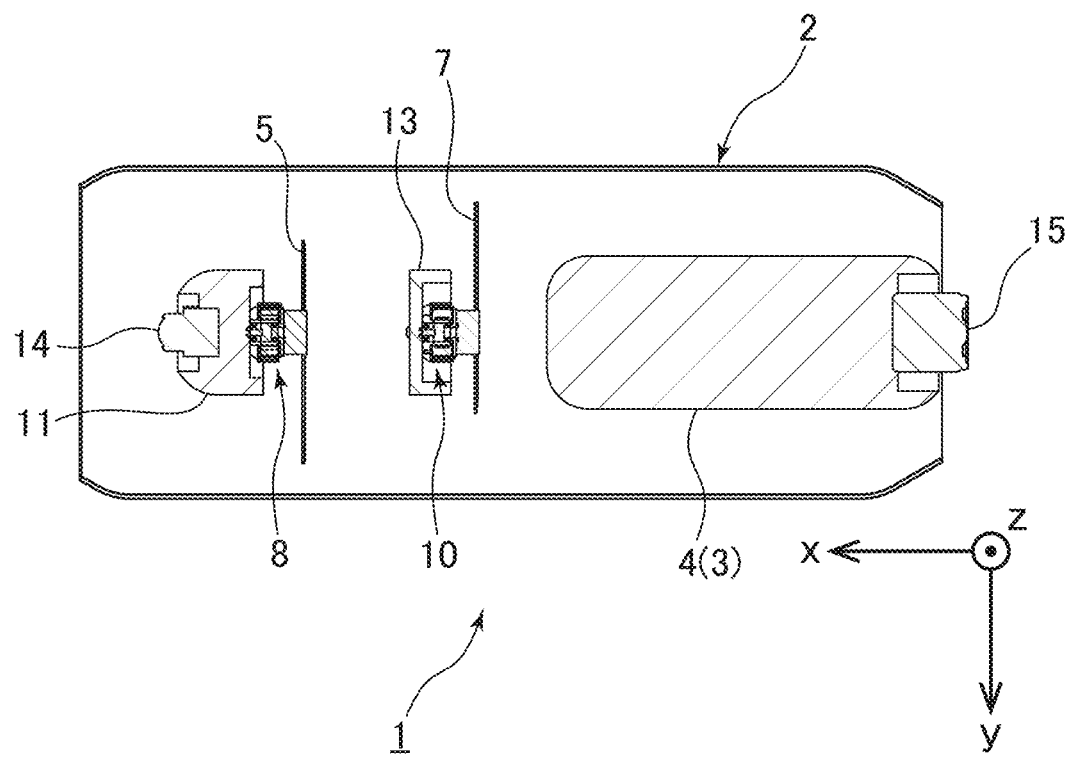
FIG. 2 illustrates the configuration of the moving object provided with two rotors according to the embodiment of the present invention.

As described above, the number of rotors is not limited to three and may be any number not smaller than two. FIG. 2 illustrates an example of the configuration of the moving object provided with two rotors. The configuration of the moving object 1 in FIG. 2 may be identical to that of the three rotor moving object 1 except for the provision of the two rotors. In the moving object 1 of FIG. 2, the rotors 5 and 7 are rotated in different directions. For example, the rotor 5 is rotated counterclockwise when viewed in the negative direction of x in FIG. 1A and the rotor 7 is rotated clockwise when viewed in the negative direction of x in FIG. 1A. Thus, at least the rotations of the moving object 1 can be reduced like the three-rotor moving object 1.

Figure 3:
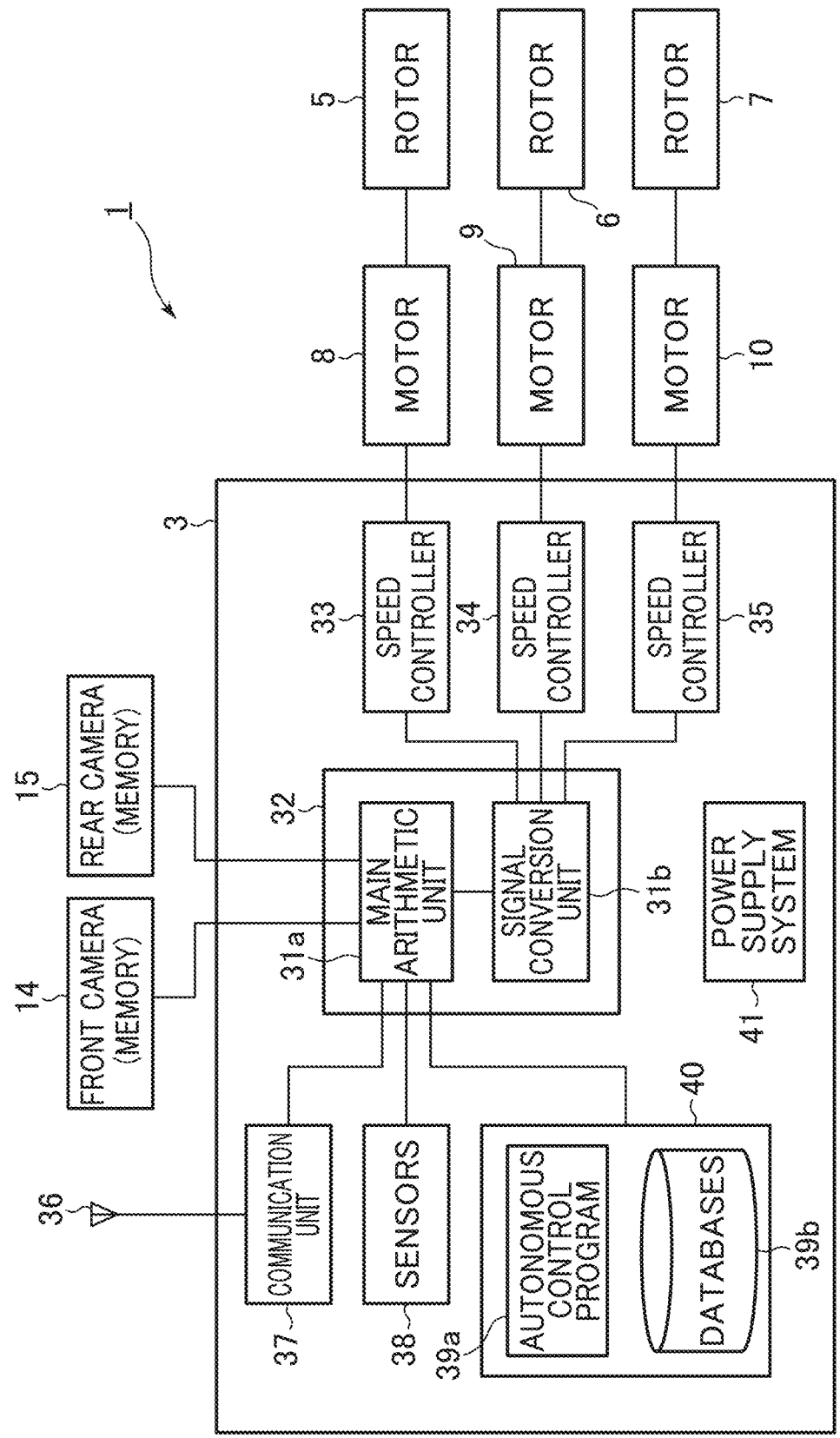
FIG. 3 is a block diagram illustrating the functional configuration of the moving object in FIG. 1A.

FIG. 3 is a block diagram illustrating the functional configuration of the moving object in FIG. 1A. The body part 3 of the moving object 1 includes: a main arithmetic unit 31a that includes a processor and a temporary memory and performs various operations; a signal conversion unit 31b that performs processing such as the conversion of control-command-value data obtained by the operations of the main arithmetic unit 31a into a pulse signal (PWM: Pulse Width Modulation signal) and includes a processor and a temporary memory (an arithmetic unit including the main arithmetic unit 31a and the signal conversion unit 31b will be referred to as a control-signal generation unit 32), speed controllers (ESC: Electric Speed Controller) 33 to 35 that convert a pulse signal generated by the control-signal generation unit 32 into a driving current to the motors 8 to 10; a communication antenna 36 and a communication unit 37 (including a processor and a temporary memory) that transmit and receive data signals to and from the outside; a sensor unit 38 including sensors such as a GPS (Global Positioning System) sensor, an attitude information sensor, an altitude sensor, and an orientation sensor; a recorder 40 including recording devices such as hard disk drives for recording an autonomous control program 39a and databases 39b; and a power supply system 41 including battery devices for a lithium polymer battery and a lithium ion battery and a distribution system for the elements. Additionally, the moving object 1 may include any functional units and information according to the use of the function.

The attitude information sensor included in the sensor unit 38 may be, for example, a three-axis angular velocity sensor for measuring the angular velocities of the rotations of rolling, pitching, and yawing in the moving object 1 in FIG. 1A. The sensor may be installed as a "six-axis gyro" sensor in the moving object 1, the gyro sensor being combined with acceleration sensors for measuring accelerations in x direction, y direction, and z direction of FIG. 1A. In this case, "attitude information" may be information including at least one of the angular velocities of the rotations of rolling, pitching, and yawing or information including at least one of the rotation angles of a rolling angle, a pitching angle, and a yawing angle as information on the inclination of the moving object 1, the inclination being obtained by integrating the measurement value of the angular velocity measured by the angular velocity sensor with respect to time (an integration calculation may be performed by, for example, any arithmetic unit provided in the attitude information sensor or the main arithmetic unit 31a). In this case, "measurement" is not limited to the measurement of an angular velocity and may include the determination of, for example, the rotation angle from the measurement value of a measured angular velocity or the like by calculation. For example, in a configuration where an angular velocity is measured by the angular velocity sensor and a rotation angle is calculated by the main arithmetic unit 31a, the angular velocity sensor and the main arithmetic unit 31a may constitute "attitude information sensor." The main arithmetic unit 31a executes the autonomous control program 39a by using the attitude information, so that a control command value for controlling the rotation speed of at least one of the rotors 5 to 7 is calculated. The signal conversion unit 31b converts control-command-value data obtained by the operation of the main arithmetic unit 31a into a pulse signal, the speed controllers 33 to 35 convert the pulse signal into a driving current to the motors 8 to 10, and the motors 8 to 10 control the rotation speeds of the rotors 5 to 7, enabling attitude autonomous control (in this case, the control-signal generation unit 32 including the main arithmetic unit 31a and the signal conversion unit 31b acts as an attitude control unit and controls the motors 8 to 10 via the speed controllers 33 to 35). As a specific example, for example, if a measurement using the attitude sensor detects that the body of the moving object 1 (in the present example, components other than the rotors 5 to 7 constitute the body in the moving object 1) has an angular velocity for positive rolling (a rotation in the direction of an arrow about x axis in FIG. 1A) or the body has been already inclined by positive rolling, the main arithmetic unit 31a can determine a control command value for increasing the rotation speed of the rotor 6 and reducing the rotation speeds of the rotors 5 and 7 (in other words, torque for rotating the moving object 1 opposite to the rotation direction of the moving object 1 can be generated or increased by relatively increasing the rotation speed of the rotor that rotates in the same direction as the rotation speed of the moving object 1) in order to generate torque for negative rolling of the moving object 1 (on the assumption that the rotors 5 to 7 rotate in the directions of FIG. 1J). As described above, the rotation speeds of the rotors 5 to 7 are controlled by using the control command value, thereby reducing at least the positive or negative rolling of the body of the moving object 1 so as to obtain a stable attitude. In an example of an operation in a semiautomatic mode in the moving object 1, an external control signal for accelerating or decelerating the moving object 1 in the forward direction is transmitted from an external controller (not illustrated), the moving object 1 receives the external control signal via the communication antenna 36, the communication unit 37 performs necessary processing such as filtering and conversion and then transmits the signal to the main arithmetic unit 31a, and the main arithmetic unit 31a generates the control command value for increasing or reducing the rotation speeds of the rotors 5 to 7 in response to the external control signal. Thereafter, as has been discussed, the moving speed of the moving object 1 is controlled by a process for controlling the rotation speeds of the rotors 5 to 7 by processing such as conversion on a pulse signal; meanwhile, as described above, the attitude of the moving object 1 is autonomously controlled by the attitude information sensor and the attitude control unit. In the autonomous control of the attitude, the rotation speeds of some of the rotors may be increased and the rotation speeds of the other rotors may be reduced so as to keep constant the total of the rotation speeds of the rotors or adjust the total of the rotation speeds to any rotation speed. Alternatively, the attitude may be controlled only by increasing or reducing the rotation speeds of some of the rotors. In an example of a manual mode in the moving object 1, external control signals for separately increasing or reducing the rotation speed of the rotor 5, the rotation speed of the rotor 6, and the rotation speed of the rotor 7 can be transmitted from the external controller and the moving object 1 can separately control the rotation speeds of the rotors 5 to 7 in response to the external control signals. In this case, the attitude of the moving object 1 is manually controlled as well as the moving speed.

Figure 4:
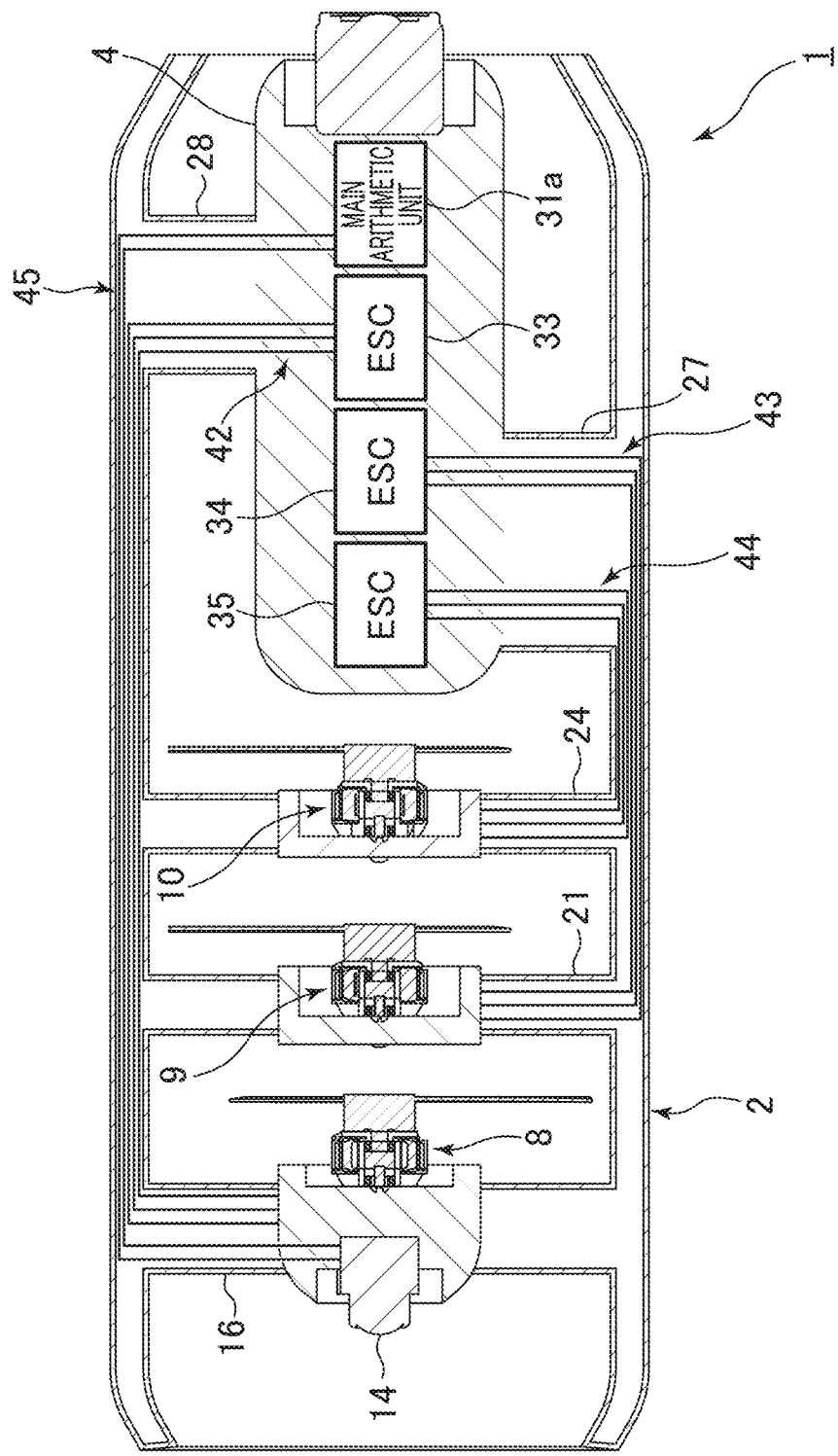
FIG. 4 is an explanatory drawing illustrating wires laid in the hollow parts of a cover member and connecting arms in the moving object of FIG. 1A.

FIG. 4 is an explanatory drawing illustrating wires laid in the hollow parts of the cover member and the connecting arms in the moving object of FIG. 1A. As described above, the connecting arms 16 to 30, the cover member 2, and the waterproof case 4 are formed as hollow members. As illustrated in FIG. 4, the hollow parts of the members are connected so as to lay the wires between the members (In FIG. 4, the hollow parts and the connected parts are illustrated in the same plane for convenience but as illustrated in FIG. 1I, it is to be noted that all the connecting arms 16 to 30 are not always disposed in the same plane. Also in, for example, FIG. 6.) In the configuration of FIG. 4, the speed controller 33 and the motor 8 are connected to each other via wires (conductors) 42 laid through the hollow part of the waterproof case 4, the hollow part of the connecting arm 28, the hollow part of the cover member 2, and the hollow part of the connecting arm 16 (in FIG. 4, the wires 42 are connected to the motor holding part 11 but the wires 42 are actually connected to the motor 8. The speed controllers 34 and 35 and the motors 9 and 10 are similarly connected via wires (conductors) 43 and 44). The speed controller 34 and the motor 9 are connected to each other via the wires (conductors) 43 laid through the hollow part of the waterproof case 4, the hollow part of the connecting arm 27, the hollow part of the cover member 2, and the hollow part of the connecting arm 21. The speed controller 35 and the motor 10 are connected to each other via the wires (conductors) 44 laid through the hollow part of the waterproof case 4, the hollow part of the connecting arm 27, the hollow part of the cover member 2, and the hollow part of the connecting arm 24. Moreover, the main arithmetic unit 31a and the front camera 14 are connected to each other via wires (signal lines) 45 laid through the hollow part of the waterproof case 4, the hollow part of the connecting arm 28, the hollow part of the cover member 2, and the hollow part of the connecting arm 16.

Figure 5:
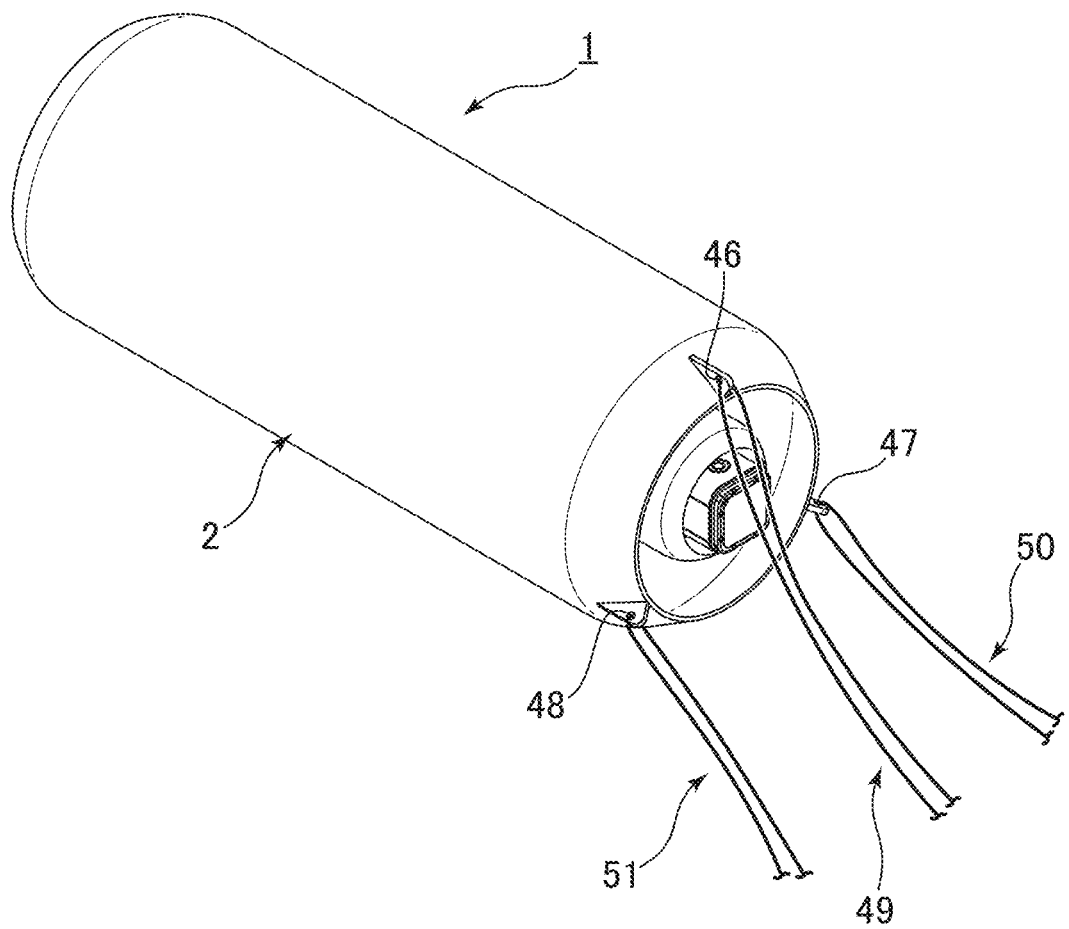
FIG. 5 illustrates a configuration in which linear members are connected to the moving object such that the linear members are drawn through holes on the moving object of FIG. 1A.
Figure 11:
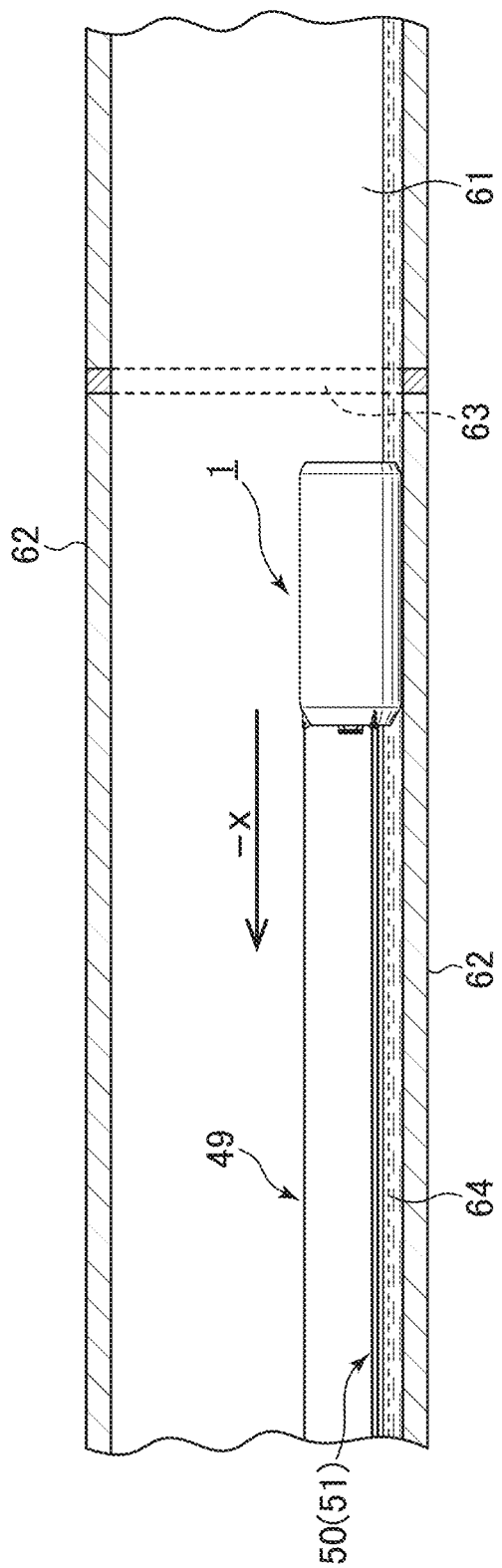
FIG. 11 illustrates that the linear members are pulled after a forward movement of the moving object in FIG. 10, so that a rear-direction shooting camera captures the interior of a closed-type space while the moving object is moved rearward.

FIG. 5 illustrates a configuration in which the linear members are connected to the moving object such that the linear members are drawn through the holes on the moving object of FIG. 1A. The linear members 49 to 51 such as strings are drawn through the holes 46 to 48 on the cover member 2, so that the linear members 49 to 51 are connected to the moving object 1. As will be described later with reference to FIG. 11, the linear members 49 to 51 are pulled after a forward movement of the moving object 1, so that the rear direction shooting camera 15 can capture the interior of the closed-type space while the moving object 1 is moved rearward.

Figure 6:
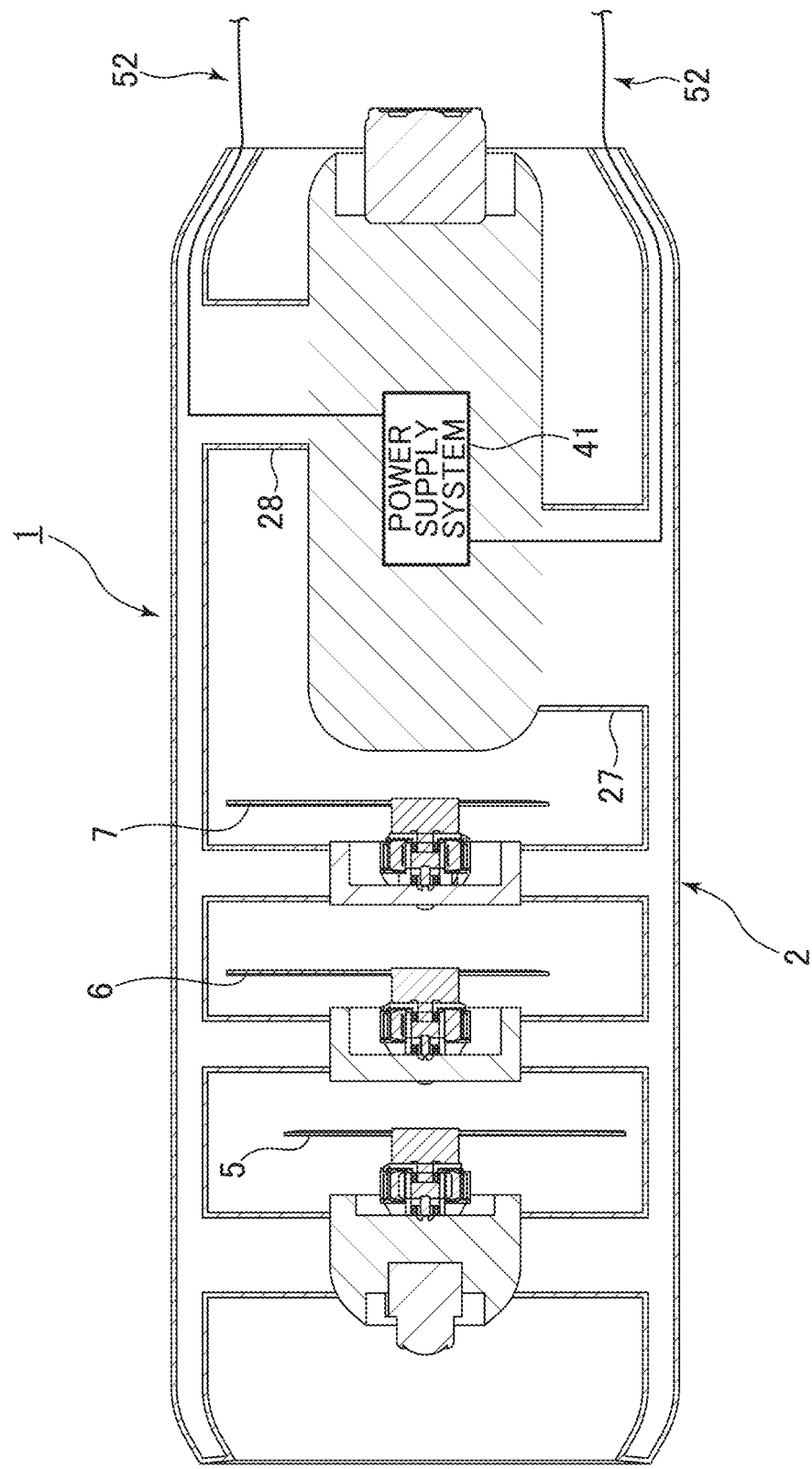
FIG. 6 schematically illustrates a configuration in which power supply lines are connected from the outside to a power supply system in the body part of the moving object in FIG. 1A.

The linear members 49 to 51 such as strings may be replaced with any linear members. As an example, FIG. 6 schematically illustrates a configuration in which power supply lines 52 are connected from the outside to the power supply system 41 in the body part 3 of the moving object 1 in FIG. 1A. In the configuration of FIG. 6, the power components including the motors 8 to 10 in the moving object 1 are operated by power supplied from an external power supply (not illustrated) through the power supply lines 52. The power supply lines 52 are connected to, for example, a circuit (not illustrated) for power distribution control in the power supply system 41 (via the hollow part in the cover member 2). Specifically, power is supplied to the power supply system 41 through the power supply lines 52, power is supplied to the components including the main arithmetic unit 31a and the speed controllers 33 to 35 through the circuit for power distribution control in the power supply system 41, and as described above, current is supplied to the motors 8 to 10 from the speed controllers 33 to 35 so as to rotate the rotors 5 to 7. Like the configuration in which the linear members 49 to 51 are used, the power supply lines 52 are pulled after a forward movement of the moving object 1, so that the rear direction shooting camera 15 can capture the interior of the closed type space while the moving object 1 is moved rearward.

Figure 7:
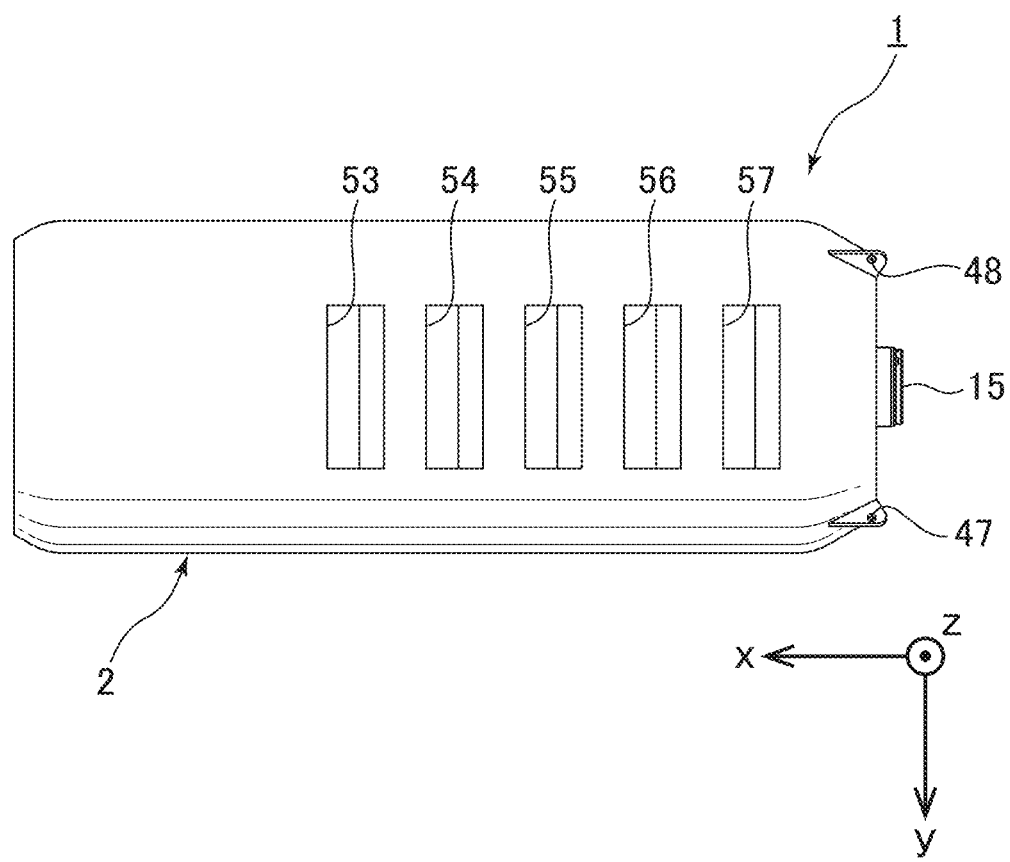
FIG. 7 illustrates a configuration in which exhaust holes are provided on the underside of the cover member of the moving object in FIG. 1A.

Moreover, a gas flow during a movement of the moving object can be regulated by providing exhaust holes (FIG. 7) on one side of the underside of the cover member (in FIG. 1A, the positive-direction side of z). In the configuration of FIG. 7, exhaust holes 53 to 57 that are rectangular in cross section are provided (as illustrated in FIG. 8(b), the exhaust holes diagonally extend through the side wall of the cover member 2 when viewed from a cross section of the cover member 2). FIG. 8 illustrates gas flows when the rotors rotate in the configuration of FIG. 7 (a two-rotor type is illustrated for simplicity and the gas flows of a three-rotor type are similar to those of the two rotor type. The moving object 1 moves in a sewer pipe 58 that is illustrated as an example of the closed-type space). Gas flows between the moving object. 1 and the lower boundary surface of a closed-type space or the like (the boundary surface may be the inner surface of a sewer pipe or an interface with water or the like in the sewer pipe), thereby generating flows of gas as indicated by arrows W2 in FIG. 8 unlike the gas flows indicated by the arrows W in FIG. 1E. The flowing gas is expected to float the moving object 1 or reduce at least friction between the cover member 2 of the moving object 1 and the lower boundary surface.

Moving and Photographing by the Moving Object in a Closed-Type Space

Referring to FIGS. 9 to 12, moving and photographing in a sewer pipeline will be described below as an example of moving and photographing by the moving object 1 in a closed-type space. However, as described above, the use of the moving object and the method for using the same according to the present invention is not limited to the moving and photographing. The moving object and the method for using the same according to the present invention are usable for any purpose in any environment.

Figure 9:
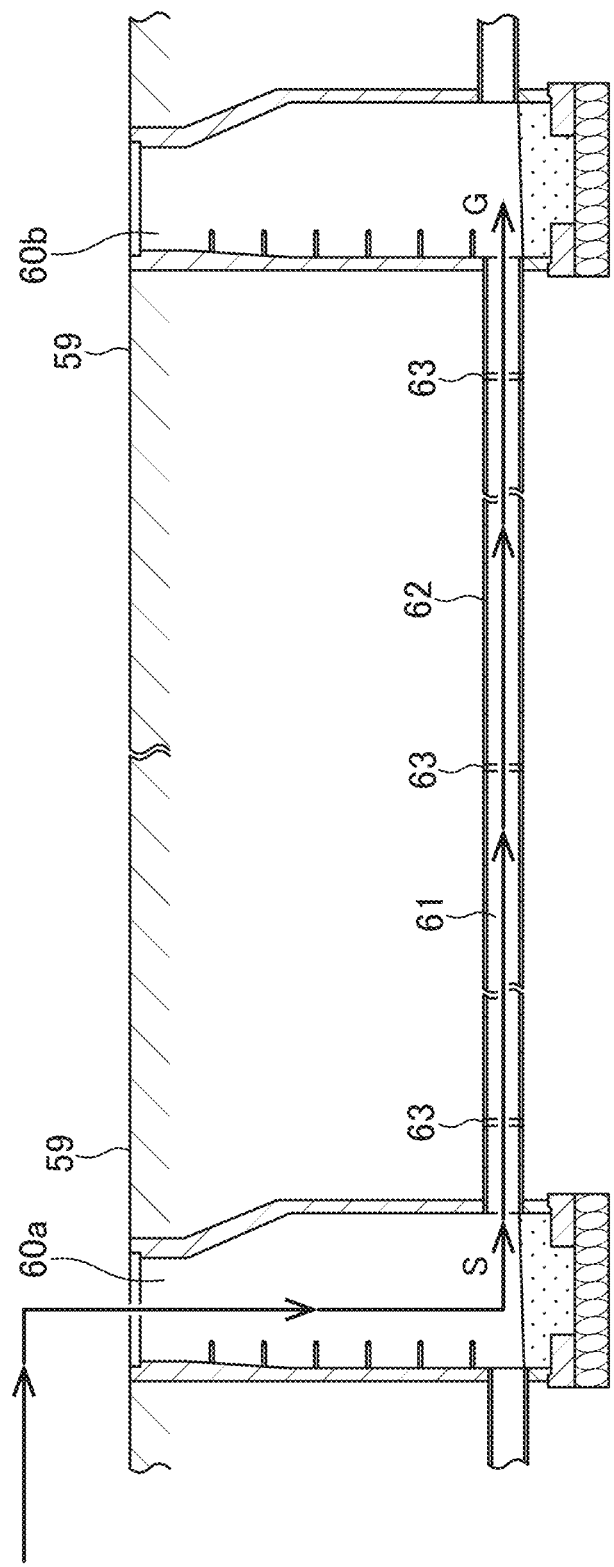
FIG. 9 illustrates the structure of a sewer pipeline facility where the moving object of FIG. 1A can be moved.
Figure 10:
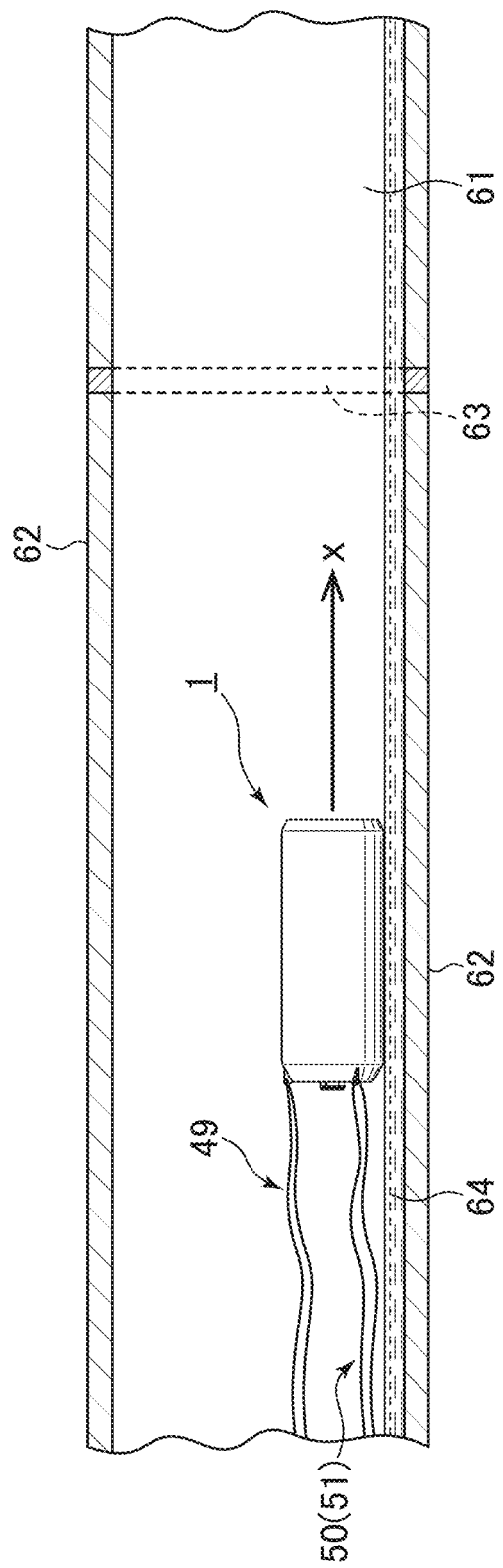
FIG. 10 illustrates the moving object of FIG. 1A, the moving object moving in a cylindrical space in the sewer pipeline facility of FIG. 9.

FIG. 9 illustrates the structure of a sewer-pipe-line facility where the moving object of FIG. 1A can be moved. A manhole 60a provided on a ground surface 59 communicates with a sewer pipeline 61 and moving in the sewer pipeline 61 to the right in FIG. 9 reaches another manhole 60b (In FIG. 9, the sewer pipeline 61 cut at two points is illustrated for convenience but the actual sewer pipeline 61 is seamlessly formed and is extended longer than that of FIG. 9). The boundary surface of the closed type space is determined by an inner wall 62 of the sewer pipeline 61. The sewer pipeline 61 further includes connecting points 63 placed at predetermined distances to the right in FIG. 9.

In moving and photographing by the moving object 1 in the sewer pipeline 61, the moving object 1 is first placed into the manhole 60a and then is lowered to the depth of the sewer pipeline 61. For example, a holding base is provided at the tip of a pole as long as the depth of the manholes 60a and 60b. The pole is inserted into the manhole 60a with the moving object 1 placed on the holding base, so that the moving object 1 is lowered.

The moving object 1 connected to the linear members 49 to 51 or the power supply lines 52 (see FIG. 6) starts moving and photographing (FIG. 10) from the starting position of moving and photographing to the right in FIG. 9 (the direction is the positive direction of x, that is, the traveling direction in FIG. 1A). In this case, the moving object 1 operates according to the example of the semiautomatic mode. The moving object 1 autonomously controls the attitude while moving in the traveling direction in response to an external control signal from the external controller that provides an instruction for acceleration or deceleration in the forward direction, and the moving object 1 captures still images or moving images in the sewer pipeline 61 by means of the front camera 14 and the rear direction shooting camera 15. The sewer pipeline 61 normally contains water 64. The moving object 1 may move in the traveling direction while being placed in contact with the water surface of the water 64 or at least partially immersed in the water 64. Alternatively, the moving object 1 may move in the traveling direction in contact with the lower wall surface of the sewer pipe. In the absence of the water 64, for example, the moving object 1 in contact with the lower wall surface of the sewer pipe moves in the traveling direction. As has been discussed with reference to FIGS. 7 and 8, the moving object 1 may be floated and moved by regulating a gas flow between gas and the lower wall surface of the sewer pipe through, for example, the exhaust holes 53 to 57 provided on the underside of the cover member 2 (the moving object 1 can be similarly floated in the presence of the water 64 or the like).

Data on still images or moving images captured by the rear direction shooting camera 15 is recorded in the internal memory of the rear-direction shooting camera 15 and data on still images or moving images captured by the front camera 14 is recorded in the internal memory of the front camera 14 and is transmitted at any time to the external computer of an operator from the communication antenna 36 by the communication unit 37. The operator displays the still images or moving images captured by the front camera 14 on the display of the external computer by using the received data and operates the moving object 1 through the external controller while checking the images (in the case of insufficient communication quality between the external controller and the communication antenna 36, a ratio relay station is preferably installed in advance in the sewer pipeline 61. A GPS signal can be similarly received via a radio relay station or the like). For example, the operator operates the moving object 1 while checking a traveling distance of the moving object 1 by using the connecting points 63 as markers in the displayed still images or moving images.

When the moving object 1 reaches the other end of the sewer pipeline 61 (in FIG. 9, the right end of the sewer pipeline 61. Hereinafter, the right end will be referred to as an end position G of moving and photographing) or the moving object 1 cannot move forward any more because of the lengths of the linear members 49 to 51 (or the power supply lines 52), the forward movement of the moving object is completed (the forward movement may be completed at any time under the control of the external controller). The transmission of the external control signal from the external controller is stopped (or a stop signal is transmitted) to stop the rotations of the rotors 5 to 7 of the moving object 1, and then the sewer pipeline 61 is captured by the rear direction shooting camera 15 while the moving object 1 is moved rearward (the negative direction of x in FIG. 1A) by pulling the linear members 49 to 51 (or the power supply lines 52) connected to the moving object 1. This enables photographing without being affected by, for example, water splashes caused by the rotations of the rotors 5 to 7. Alternatively, photographing by the rear direction shooting camera 15 may be performed only when the moving object 1 moves rearward described above. In this case, photographing by the rear-direction shooting camera 15 may be stopped during a forward movement of the moving object 1, the rotations of the rotors 5 to 7 are stopped after the completion of the forward movement, and then photographing by the rear direction shooting camera 15 may be started in response to a control signal or the like from a remote controller.

The moving object 1 is returned to the starting position S (FIG. 9) by continuously pulling the linear members 49 to 51 (or the power supply lines 52). The pole with the holding base at the tip of the pole is inserted into the manhole 60a, the moving object 1 is placed on the holding base, and then the pole is lifted, so that the moving object 1 is collected. The rear-direction shooting camera 15 is removed from the collected moving object 1 and the conditions of, for example, the sewer pipeline 61 and the inner wall 62 can be checked by viewing still images or moving images recorded in the memory of the camera.

Figure 12:
FIG. 12 shows an example of an image in the sewer pipeline to be captured by a front camera.

FIG. 12 shows an example of an image in the sewer pipeline to be captured by the front camera. A similar image is expected to be captured by the moving and photographing of the moving object 1 including the front camera 14. An operator can operate the moving object 1 by using the external controller while viewing still images or moving images captured from a first-person viewpoint by the front camera 14 of FIG. 12. After the moving and photographing, the rear direction shooting camera 15 is removed from the collected moving object 1 and the conditions of the sewer pipeline 61, for example, cracks on the inner wall 62 or displaced gaskets at the connecting points 63 can be checked by viewing still images or moving images recorded in the memory of the camera.

INDUSTRIAL APPLICABILITY

The present invention can be used for photographing and inspections in any closed-type spaces such as a water supply pipeline, a sewer pipeline, a drain, a highway tunnel, a highway drain, a cable tunnel, a duct, a pipe shaft, and a gas pipeline. The present invention can be also used when the moving object is moved for any purpose in any spaces other than a closed-type space.

REFERENCE SIGNS LIST

1 Moving object
2 Cover member
3 Body part
4 Waterproof case
5 to 7 Rotor
5a to 7c Rotor blade
8 to 10 Motor
11 to 13 Motor holding part
14 Front camera
15 Rear camera
16 to 30 Connecting arm
31a Main arithmetic unit
31b Signal conversion unit
32 Control-signal generation unit
33 to 35 Speed controller
36 Communication antenna
37 Communication unit
38 Sensors
39a Autonomous control program
39b Databases
40 Recorder
41 Power supply system
42 to 45 Wire
46 to 48 Hole 49 to 51 Linear member
52 Power supply line
53 to 57 Exhaust holes
58 Sewer pipe
59 Ground surface
60a, 60b Manhole
61 Sewer pipeline
62 Inner wall
63 Connecting point
61 Water

The invention claimed is:

1. A moving object, the moving object comprising:
a first rotor including a first motor and a second rotor including a second motor aligned along an axis defined in a traveling direction; and
a driver for driving the first and second motors and rotating the first and second rotors in different directions,
a cover having a hollow structure elongating along the axis defined in the traveling direction, the cover connected to and carried by the first and second rotors arranged within the hollow structure along the axis and configured to partially cover the first and second rotors with a side surface, with respect to the axis defined in the traveling direction, of the cover, wherein the cover further includes:
a plurality of gas exhaust holes arranged along the axis defined in the traveling direction in the side surface of the cover at an underside with respect to the traveling direction, and
wherein each of the gas exhaust holes diagonally extends through a side wall of the cover at the underside from the inside of the cover to the outside of the cover and from a front side to a back side with respect to the traveling direction.

2. The moving object according to claim 1, wherein the driver includes at least two motors for providing the respective rotors with powers, and at least two of the at least two motors are configured to rotate the rotors powered by them in different directions.

3. The moving object according to claim 1, further comprising:
an attitude information sensor for measuring attitude information on an attitude of the moving object; and
an attitude controller for controlling the driver such that the attitude of the moving object is controlled by controlling a rotation speed of at least one of the at least two rotors according to the attitude information measured by the attitude information sensor.

4. The moving object according to claim 1, further comprising a traveling-direction shooting camera and a traveling-direction captured-image data transmitter,
wherein the moving object is configured to capture an image in the traveling direction by means of the traveling-direction shooting camera and move while transmitting obtained traveling-direction captured-image data from the traveling-direction captured-image data transmitter to outside.

5. The moving object according to claim 1, further comprising a rear-direction shooting camera.

6. The moving object according to claim 5, wherein the rear-direction shooting camera is positioned on a rear side of the at least two rotors in the traveling direction and at least a part of the rotors is not interrupted by the rear-direction shooting camera when viewed from the rear side.

7. The moving object according to claim 1, wherein the moving object is connected to a line.

8. The moving object according to claim 7, wherein the line include a power supply line, and
the moving object is configured to move while receiving power supply from an external power supply through the power supply line.

9. A method comprising:
deploying, within a pipeline, a moving object for inspection within the pipeline;
moving the moving object in a traveling direction corresponding to a first direction extending along the pipeline, the moving object including:
at least two rotors arranged back and forth in the traveling direction;
a driver for driving the at least two rotors and rotating at least two of the at least two rotors in different directions; and
a rear-direction shooting camera, wherein the moving object is connected to a line; and
moving, using the line, the moving object in a second direction, wherein the second direction is opposite to the traveling direction;
capturing images inside the pipeline by means of the rear-direction shooting camera as the moving object moves in the second direction.

* * * * *